US012100284B2

(12) United States Patent
Berrios et al.

(10) Patent No.: US 12,100,284 B2
(45) Date of Patent: Sep. 24, 2024

(54) SYSTEM AND METHOD FOR PROVIDING A VACATION MODE OF HOME DEVICE OPERATION

(71) Applicant: Universal Electronics Inc., Scottsdale, AZ (US)

(72) Inventors: Victor Berrios, Gilbert, AZ (US); Nicu Ahmadi, Santa Ana, CA (US); ARsham Hatambeiki, San Francisco, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 188 days.

(21) Appl. No.: 17/076,293

(22) Filed: Oct. 21, 2020

(65) Prior Publication Data

US 2022/0122745 A1 Apr. 21, 2022

(51) Int. Cl.

| | |
|---|---|
| ***G16Y 40/50*** | (2020.01) |
| ***G08B 21/18*** | (2006.01) |
| ***G08B 25/10*** | (2006.01) |
| ***G16Y 10/80*** | (2020.01) |

(Continued)

(52) U.S. Cl.
CPC ............. *G08B 21/18* (2013.01); *G08B 25/10* (2013.01); *G16Y 10/80* (2020.01); *G16Y 20/10* (2020.01); *G16Y 20/20* (2020.01); *G16Y 40/50* (2020.01)

(58) Field of Classification Search
CPC .. A61B 5/0022; G01D 4/008; G05B 13/0265; G05B 15/02; G05B 23/024; G06F 1/3203; G06F 3/167; G06Q 30/0202; G06Q 30/0631; G08B 21/18; G08B 25/10; G08B 15/002; G16Y 10/80; G16Y 20/10; G16Y 20/20; G16Y 40/50; H04L 12/2807;

(Continued)

(56) References Cited

U.S. PATENT DOCUMENTS

| | | | | |
|---|---|---|---|---|
| 6,377,858 B1 * | 4/2002 | Koeppe | G05B 15/02 | 700/12 |
| 7,665,019 B2 * | 2/2010 | Jaeger | G06F 9/453 | 715/704 |
| 10,777,057 B1 | 9/2020 | Siminoff | | |

(Continued)

FOREIGN PATENT DOCUMENTS

| | | | | |
|---|---|---|---|---|
| GB | 2565593 A * | 2/2019 | G08B 15/002 |
| JP | 2003309883 A * | 10/2003 | G07C 9/00142 |
| WO | WO-2016057761 A2 * | 4/2016 | G08B 15/002 |

OTHER PUBLICATIONS

ISA/US, International Search Report and Written Opinion issued on PCT application No. PCT/US21/54459, dated Jan. 12, 2022, 20 pages.

(Continued)

*Primary Examiner* — Stephen R Burgdorf
(74) *Attorney, Agent, or Firm* — Greenberg Traurig, LLP

(57) ABSTRACT

A controlling device periodically captures data indicative of a state of the controlling device for use in generating a vacation mode operational data. When the controlling device is subsequently placed into a vacation mode of operation, the controlling device uses the vacation mode operational data to replicate the periodically captured state of the controlling device and, thereby, the controlling device is caused to periodically issue command communications to a controllable device for the purpose of simulating the prior usage of at least the controllable device.

16 Claims, 8 Drawing Sheets

(51) Int. Cl.
*G16Y 20/10* (2020.01)
*G16Y 20/20* (2020.01)

(58) Field of Classification Search
CPC ..... H04L 63/10; H04L 67/1095; H04L 63/08; G08C 17/02; G10L 15/22; H04N 21/2668
USPC .......................................................... 340/540
See application file for complete search history.

(56) References Cited

U.S. PATENT DOCUMENTS

2001/0052862 A1 12/2001 Roelofs
2011/0040391 A1 2/2011 Noecker, Jr. et al.
2013/0325150 A1* 12/2013 Bury ...................... G05B 15/02 700/40
2014/0250597 A1* 9/2014 Chen .................. A61G 7/05769 340/12.54
2015/0134647 A1* 5/2015 Sayyarrodsari ..... G06F 16/9024 703/22
2015/0140990 A1* 5/2015 Kim ...................... H04W 8/186 455/418
2015/0160636 A1* 6/2015 McCarthy, III ........ G08B 19/00 700/90
2018/0211503 A1 7/2018 Baliga et al.
2019/0219060 A1* 7/2019 Stefankiewicz ...... F04D 27/001
2019/0220071 A1* 7/2019 Stefankiewicz ....... H05B 47/19
2019/0295395 A1* 9/2019 Magielse ............. G08B 15/002
2019/0347918 A1 11/2019 Garg et al.
2020/0035080 A1 1/2020 Correnti

OTHER PUBLICATIONS

Extended European Search Report from European application No. 21883559.3, dated Feb. 8, 2024, 9 pp.

* cited by examiner

SYSTEM AND METHOD FOR PROVIDING A VACATION MODE OF HOME DEVICE OPERATION

BACKGROUND

US 2001/0052862, which is incorporated herein by reference, describes a security system for a home that simulates usage of appliances to give the impression that someone is present. The system comprises a monitor for monitoring events indicative of state changes of the appliances during operational use of the appliance by a user; a storage for storing information about the events; an information processing component for creating a temporal pattern of usage based on the stored information; and a control interface for controlling the appliance.

US 2018/0211503, which is incorporated herein by reference, describes systems, methods and apparatus that provide intelligent lighting management for use with security applications. In some embodiments, the usage of at least one illumination device may be monitored. The illumination device may be a light bulb used in a home. Usage data for the illumination device may be recorded and used to generate a lighting schedule. The lighting schedule may be replayed to simulate occupancy, for example, to deter intruders.

SUMMARY

Described hereinafter are systems and method for simulating the prior usage of at least the controllable device. Generally, a controlling device periodically captures data indicative of a state of the controlling device for use in generating a vacation mode operational data. When the controlling device is subsequently placed into a vacation mode of operation, the controlling device uses the vacation mode operational data to replicate the periodically captured state of the controlling device and, thereby, the controlling device is caused to periodically issue command communications to a controllable device for the purpose of simulating the prior usage of at least the controllable device.

A better understanding of the objects, advantages, features, properties and relationships of the hereinafter described systems/methods will be obtained from the following detailed description and accompanying drawings which set forth illustrative embodiments and which are indicative of the various ways in which the principles of the described systems/methods may be employed.

BRIEF DESCRIPTION OF THE DRAWINGS

For a better understanding of the various aspects of the described systems and methods, reference may be had to preferred embodiments shown in the attached drawings in which.

DETAILED DESCRIPTION

The following describes systems and methods for providing, among other things, a vacation mode of home device operation.

Figure 1:
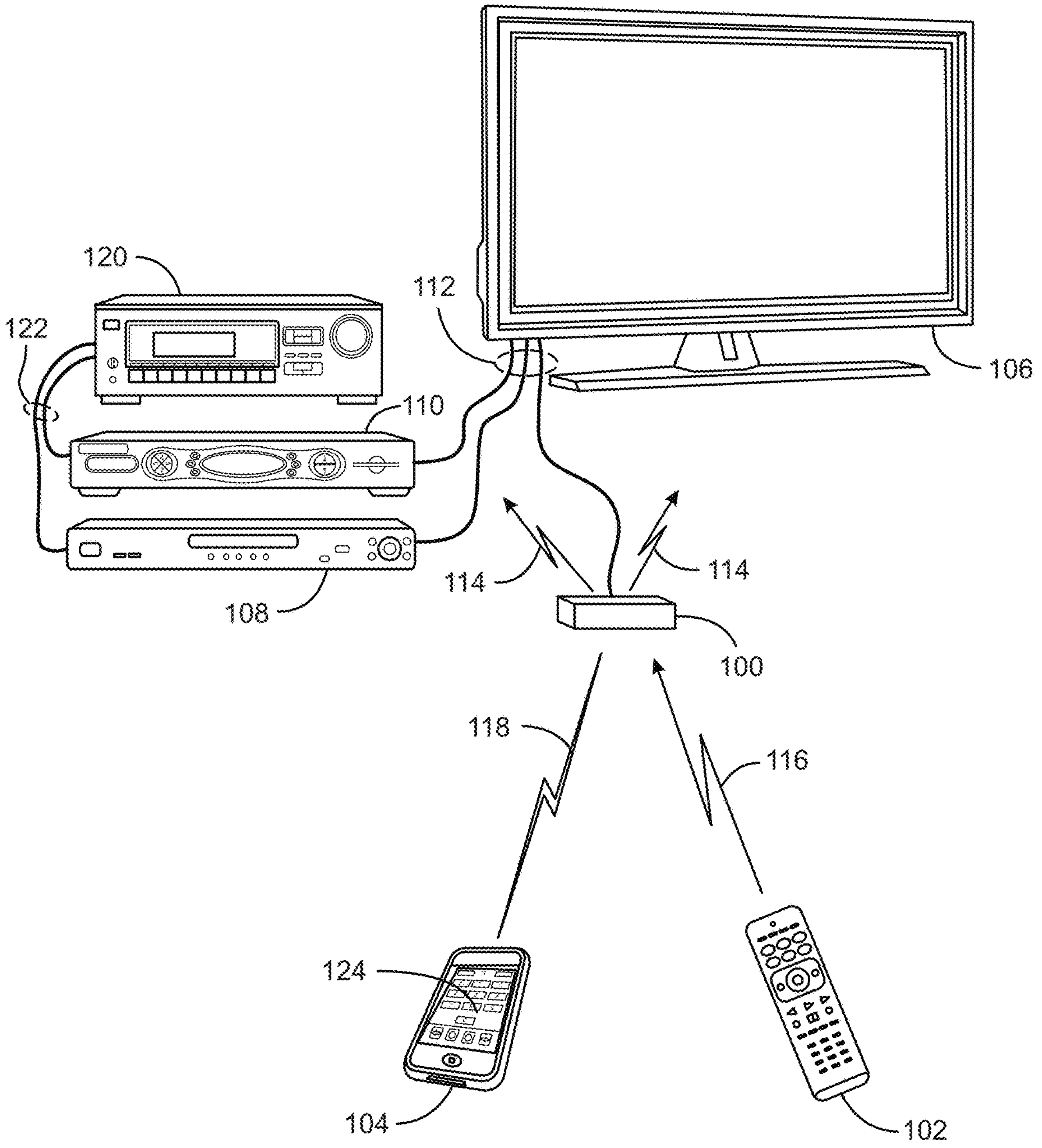
FIGS. 1 and 2 illustrate example systems in which a controlling device may be utilized to command operation of several appliances.

With reference to FIG. 1, there is illustrated an example system in which a controlling device 100 may be used to issue commands to control various controllable home devices (also referred to herein as “appliances”) such as a television 106, a cable set top box combined with a digital video recorder (“STB/DVR”) 110, a DVD player 108, and an AV receiver 120. While illustrated in the context of a television 106, STB/DVR 110, a DVD player 108, and an AV receiver 120, it is to be understood that controllable appliances may include, but need not be limited to, televisions, VCRs, DVRs, DVD players, cable or satellite converter set-top boxes (“STBs”), amplifiers, CD players, game consoles, home lighting, drapery, fans, HVAC systems, thermostats, personal computers, etc. Thus, it will be understood that the subject system and method may be used in connection with various components that would be associated with a smart home, i.e., components usable to provide home automation as well as components associated with home entertainment.

In the illustrative example of FIG. 1, appliance commands may be issued by device 100 in response to infrared (“IR”) request signals 116 received from a remote control device 102, radio frequency (“RF”) request signals 118 received from smart device 104 having a resident remote control app 124, or any other device from which device 100 may be adapted to receive requests, using any appropriate communication method. In some instance, the device 100 further supports an intelligent voice assistant, such as described in U.S. application Ser. No. 16/816,483, which is incorporated herein by reference in its entirety, whereby the device 100 will be capable of issuing commands to the appliances in response to voice commands uttered by a user—whether received directly from the user or indirectly from an intermediate device.

As illustrated, transmission of the requested appliance commands from the device to appliances 106, 108, 112, 120 may take the form of wireless IR and/or RF signals 114 or CEC commands issued over a wired HDMI interface 112, as appropriate to the capabilities of the particular appliance to which each command may be directed. Communications and device discovery may also use IP interfaces, underlying technologies such as “Thread,” a low-power wireless mesh networking protocol, and/or the like without limitation. It will also be understood that the devices may support additional or alternative communication interfaces such as Bluetooth, Zigbee, Z-Wave, etc.

In the example system illustrated in FIG. 1, AV receiver 120 may not support HDMI inputs, being connected to audio source appliances 108,110 via S/PDIF interfaces 122. Accordingly, device 100 may be constrained to transmit all commands destined for AV receiver 120 exclusively as IR or RF signals, while commands destined for the other appliances 106 through 110 may take the form of either CEC or IR signals as appropriate for each command. It is also to be understood that certain TV manufacturers may elect not to support volume adjustment via CEC. If the illustrative TV 106 is of such manufacture, device 100 may relay volume adjustment requests to TV 106 as IR signals 114, while other requests such as power on/off or input selections may be relayed in the form of CEC commands over HDMI connection 112. Thus, it will be understood that the described system will be aware of, and may adapt itself to operate in a manner that depends in whole or in part upon, the appliances within the environment, the capabilities of those appliances, the manner in which the appliances are connected, etc.

It is also to be appreciated that, while illustrated in the context of IR, RF, and wired CEC signal transmissions, in general, transmissions to and from device 100 may take the form of any convenient IR, RF, hardwired, point-to-point, or networked protocol, as necessary for a particular embodiment. Further, while wireless communications 116, 118, etc., between exemplary devices are illustrated herein as direct links, it should be appreciated that in some instances such communication may take place via a local area network or personal area network, and as such may involve various intermediary devices such as routers, bridges, access points, etc. Since these items are not necessary for an understanding of the instant disclosure, they are omitted from this and subsequent Figures for the sake of clarity.

Since remote control apps installable on smart devices, such as that contemplated in the illustrative device 104 are well known, for the sake of brevity the operation, features, and functions thereof will not be described in detail herein. Nevertheless, if a more complete understanding of the nature of such apps is desired, the interested reader may turn to, for example, U.S. patent application Ser. No. 12/406,601, U.S. patent application Ser. No. 13/329,940, (now U.S. Pat. No. 8,243,207), and Ser. No. 15/377,274, the disclosures of which are incorporated herein by reference in their entirety.

Figure 2:
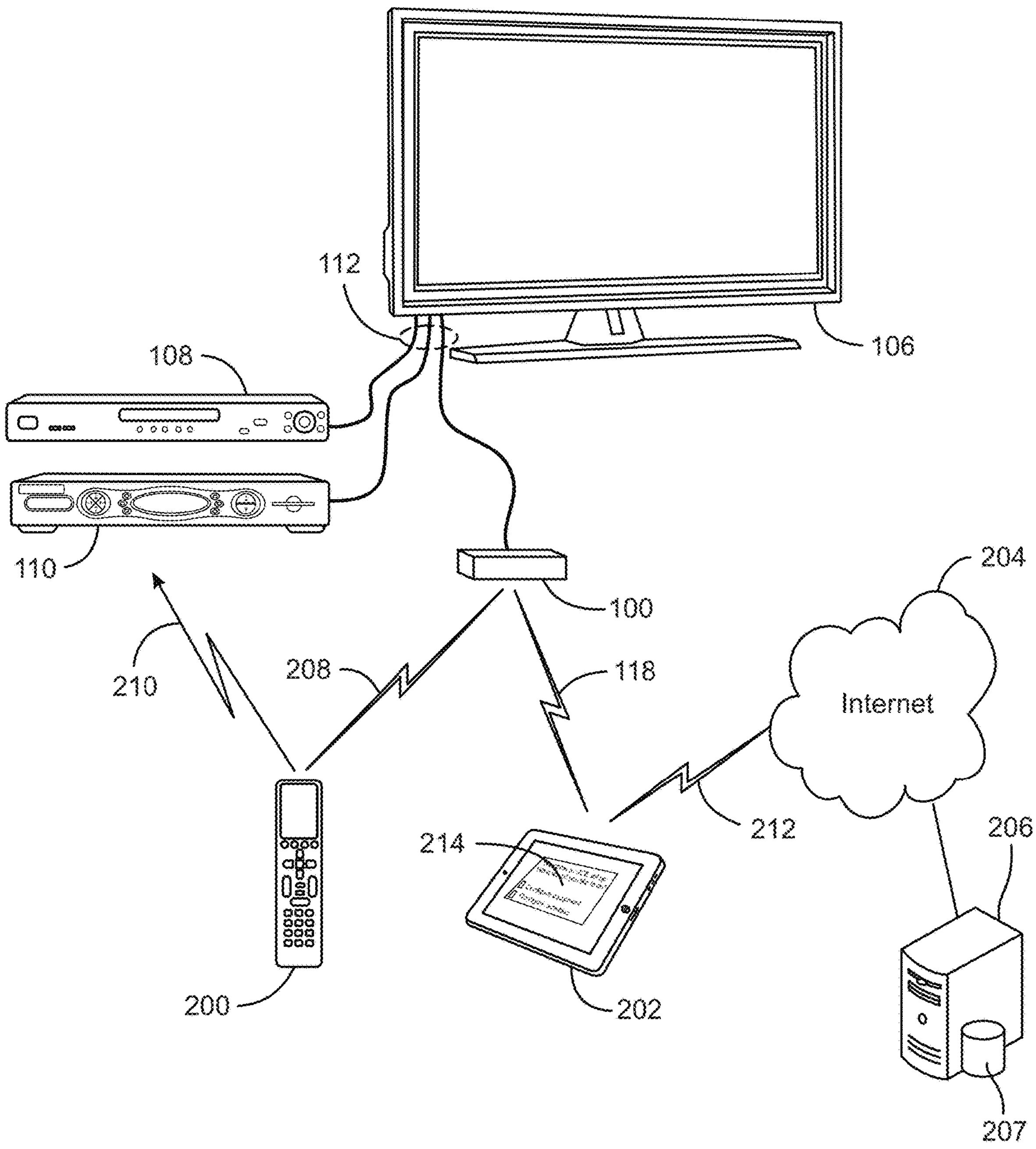

Turning now to FIG. 2, in a further illustrative embodiment, device 100 may receive wireless request signals from a remote control 200 and/or an app resident on a tablet computer 202. As before, command transmissions to appliances 106, 108, 110 may take the form of wired CEC commands or wireless IR and/or RF commands. However, in this example remote control 200 may be in bi-directional communication 208 with device 100 and accordingly the device 100 may delegate the transmission of IR and/or RF commands 210 to the device 200, i.e., use remote control 200 as a relay device for those commands determined to be best executed via IR and/or RF transmissions. As also generally illustrated in FIG. 2, a setup app 214 executing on a smart device such as tablet computer 202 may be utilized in conjunction with an Internet (212, 204) accessible or cloud based server 206 and associated database 207 to initially configure device 100 for operation with the specific group of appliances to be controlled, i.e., to communicate to device 100 a matching command code set and capability profile for each particular appliance to be controlled, for example based on type, manufacture, model number, etc.

Figure 3:
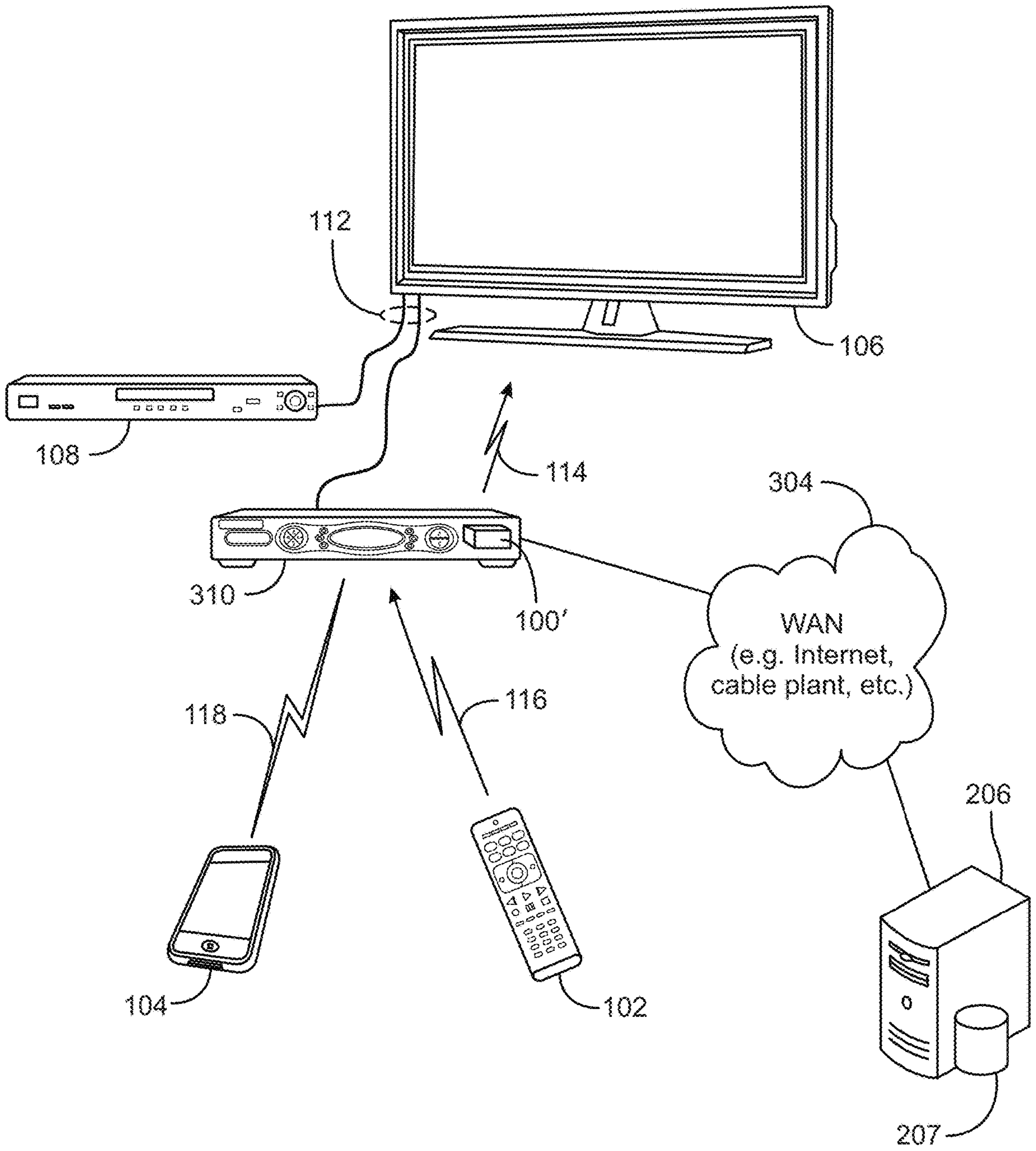
FIGS. 3 and 4 illustrate example systems in which controlling device functionality may be incorporated into an appliance which is part of a home entertainment system.

With reference to FIG. 3, in a further illustrative embodiment the aforementioned remote control functionality may be provided by one or more modules 100' embedded in a consumer electronic device, for example STB/DVR 310. When modules 100' are embedded in a consumer electronic device, the device is considered to be functionally equivalent to the above described device 100. As such, when device 100 is referenced, the accompany description will be understood to be equally applicable to an appliance having the embedded modules 100'.

In the example illustrated in FIG. 3 remote control 102 and/or smart device 104 may transmit wireless request signals directly to STB/DVR 310 for action by the built-in functional module(s) 100', which actions may, as before, comprise CEC command transmissions via HDMI connection 112 or IR/RF command transmissions 114, originating in this instance from an IR blaster or RF transmitter provisioned to the STB/DVR appliance 310. Additionally, the module 100' may itself include voice assistance capabilities and/or may cooperate with a voice assistant otherwise included within the appliance and/or the system more generally to allow for the issuance of commands in response to voice prompts being received from a user. In this configuration, a set up application resident in STB/DVR 310 may be utilized to configure functional module(s) 100', using for example an Internet connection 304 accessible through a cable modem and/or cable distribution system headend.

Figure 4:
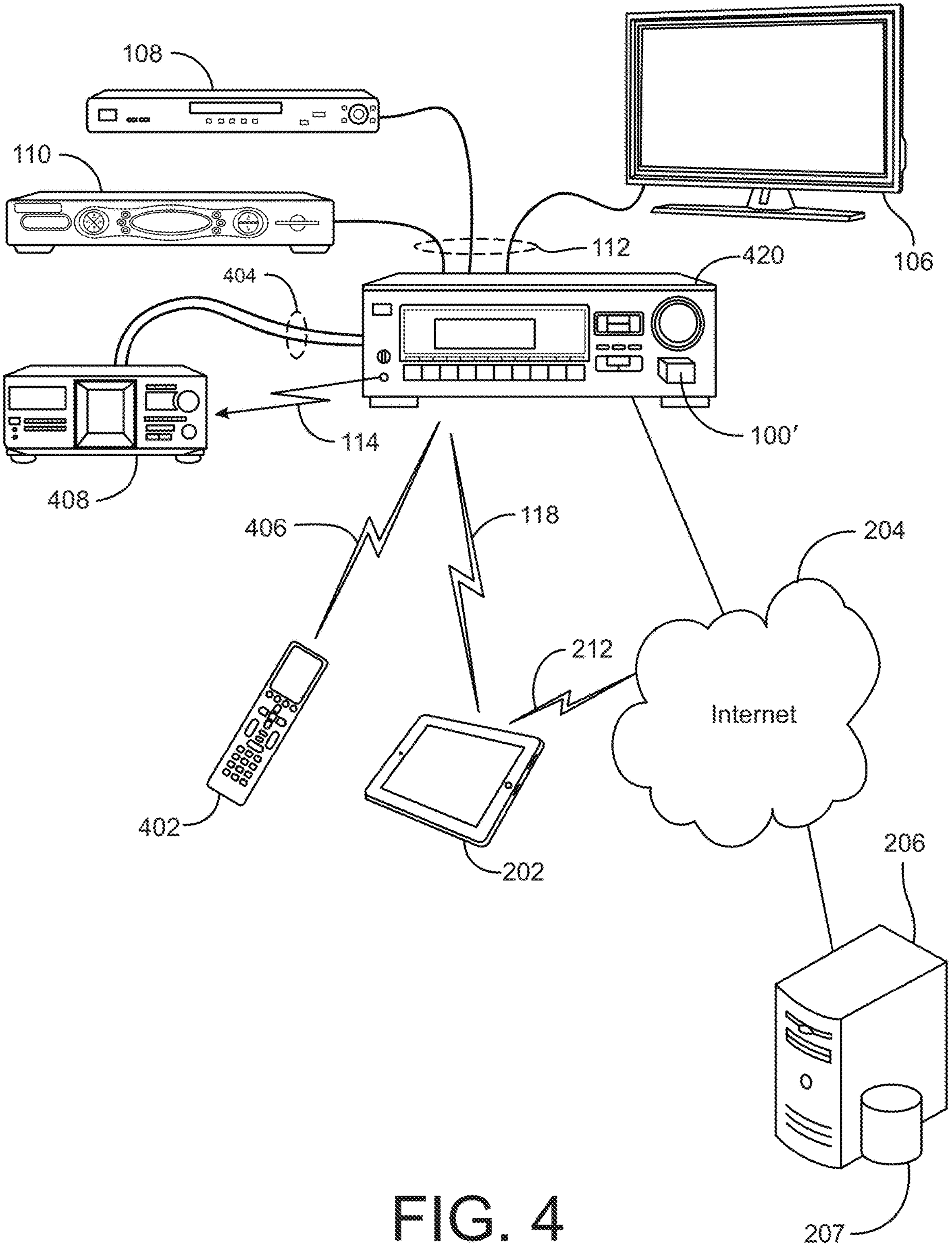

In the further illustrative embodiment of FIG. 4, the functional module(s) 100' may be embedded in an AV receiver 420 which may serve as an HDMI switch between various content sources such as a STB/DVR 110 or a DVD player 108 and a rendering device such as TV 106. In addition to HDMI inputs, AV receiver 420 may also support various other input and output formats via use of appropriate ports, for example analog inputs such as the illustrative 404 from CD player 408; composite or component video; S/PDIF coaxial or fiberoptic; etc. In this embodiment, request signals 406 may be directed to AV receiver 420, for example from remote control 402, for action by functional module(s) 100'. As before, resulting appliance commands may be transmitted using CEC signals transmitted over HDMI connections 112, or via IR signals 114 transmitted from an associated IR blaster. As appropriate for a particular embodiment, initial configuration of the functional module(s) 100' to match the equipment to be controlled may be performed by an Internet-connected app resident in AV receiver 420, or by an app resident in tablet computer 202 or other smart device, as mentioned previously in conjunction with FIG. 2.

As will be appreciated, various other configurations are also possible without departing from the underlying functional concept, for example the functional modules 100' may be incorporated into an Internet-capable TV, an HDMI switch, a game console, etc.; appliance command set and capability database 207 may be located at an internet cloud or a cable system headend, may be stored locally (in all or in part), which local storage may take the form of internal memory within the controlling device itself or in an appliance such as a TV, STB or AV receiver, or may take the form of a memory stick or the like attachable to a smart device or appliance; etc.

Figure 5:
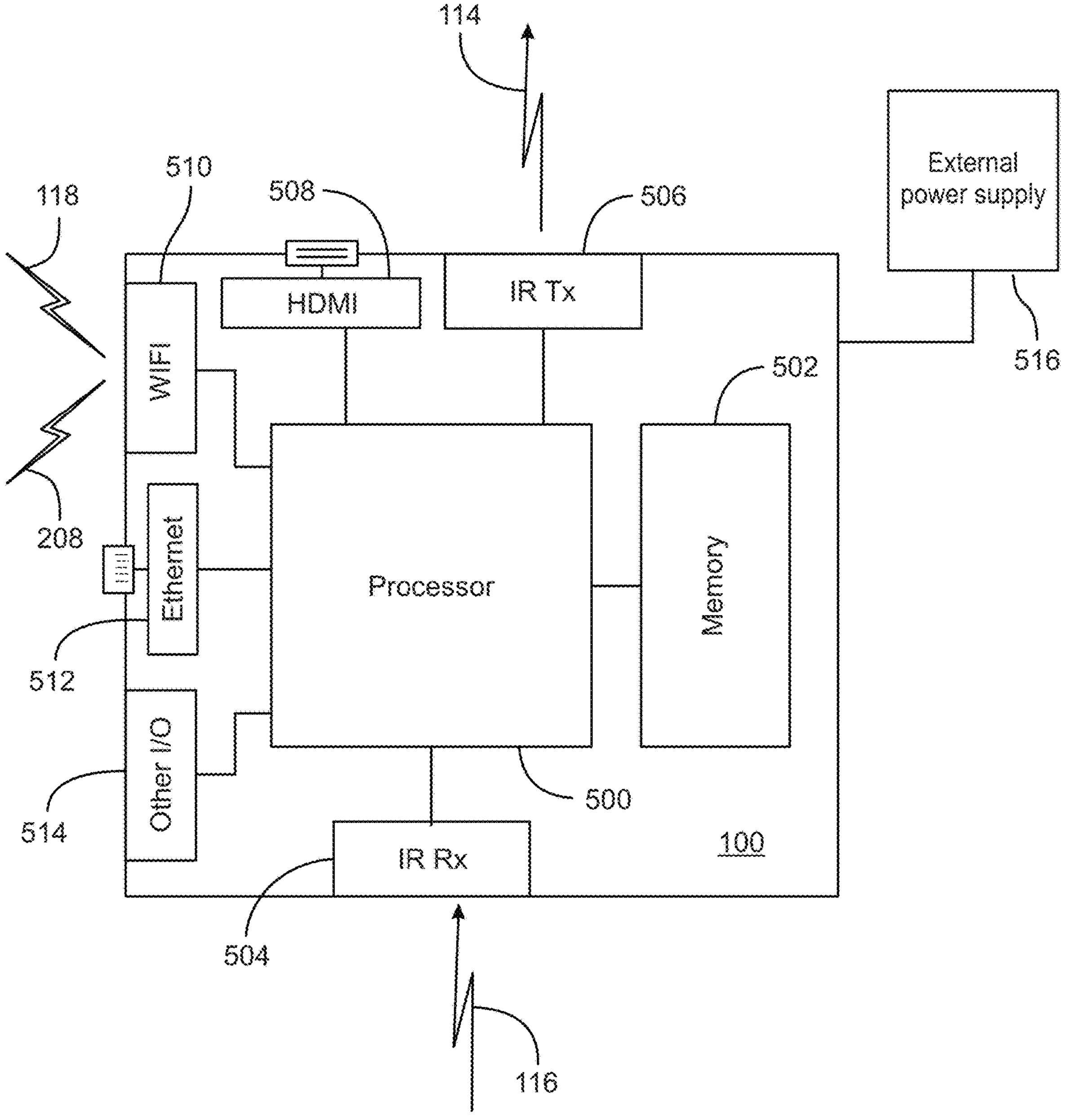
FIG. 5 illustrates a block diagram of an example controlling device.

With reference to FIG. 5, an example controlling device 100 (whether embodied as a standalone device or in an appliance supporting the functionality provided via use of embedded functional module(s) 100') includes, as needed for a particular application, a processor 500 coupled to a memory 502 which memory may comprise a combination of ROM memory, RAM memory, and/or non-volatile read/write memory which memories may take the form of a chip, a hard disk, a magnetic disk, an optical disk, a memory stick, etc., or any combination thereof. It will also be appreciated that some or all of the illustrated memory may be physically incorporated within the same IC chip as the processor 500 (a so called "microcontroller") and, as such, it is shown separately in FIG. 5 only for the sake of clarity. Interface hardware provisioned as part of the example platform may include IR receiver circuitry 504 and IR transmitter circuitry 506; an HDMI interface 508; a WiFi transceiver and interface 510; an Ethernet interface 512; and any other wired or wireless I/O interface(s) 514 as appropriate for a particular embodiment, by way of example without limitation Bluetooth, RF4CE, USB, Zigbee, Zensys, X10/Insteon, HomePlug, HomePNA, etc. The device 100 may additionally include a microphone for receiving audio commands from a consumer. The electronic components comprising the example device 100 may be powered by an external power source 516. In the case of a standalone device 100, this may comprise for example a compact AC adapter "wall wart," while a controlling device that is in the form of integrated functional module(s) 100' may draw operating power from the appliance into which they are integrated. It will also be appreciated that in the latter case, in certain embodiments processor 500 and/or memory 502 and/or certain portions of interface hardware items 504 through 514 may be shared with other functionalities of the host appliance.

It will also be understood by those skilled in the art, some or all of the memory 502 may include executable instructions that are intended to be executed by the processor 500 to control the operation of the host device as well as data which serves to define the necessary control protocols and command values for use in transmitting command signals from the host device to controllable appliances (collectively, the command data). In this manner, the processor 500 may be programmed to control the various electronic components within the exemplary device 100 or device hosting the functional module(s) 100', e.g., to monitor the communication means 504, 510 for incoming request messages from controlling devices, to cause the transmission of appliance command signals, etc.

To cause the host device to perform an action, the host device may be adapted to be responsive to events, such as a received audible communication from a consumer, a command transmitted from the remote control 102 or smart device 104, changes in connected appliance status reported over the networked ecosystem, HDMI interface 508, WiFi interface 510, or Ethernet interface 512, etc. In response to an event, appropriate instructions within the functional programming of the host device may be executed. For example, when a command request is received from a smart phone 104, the functional programming may retrieve from the command data stored in memory 502 a preferred command transmission medium (e.g., IR, CEC over HDMI, IP over WiFi, etc.) and a corresponding command value and control protocol to be used in transmitting that command to an intended target appliance, e.g., TV 106, in a format recognizable by that appliance to thereby control one or more functional operations of that appliance. By way of further example, the status of connected appliances, e.g., powered or not powered, currently selected input, playing or paused, etc., as may be discerned from interfaces 508 through 514, may be monitored and/or tabulated by the functional programming in order to facilitate adjustment of appliance settings to match user-defined activity profiles, e.g. "Watch TV", "View a movie", etc. In some instances, a customized user experience can be provided as described in U.S. application Ser. No. 16/656,153 which is incorporated herein by reference in its entirety.

Figure 6:
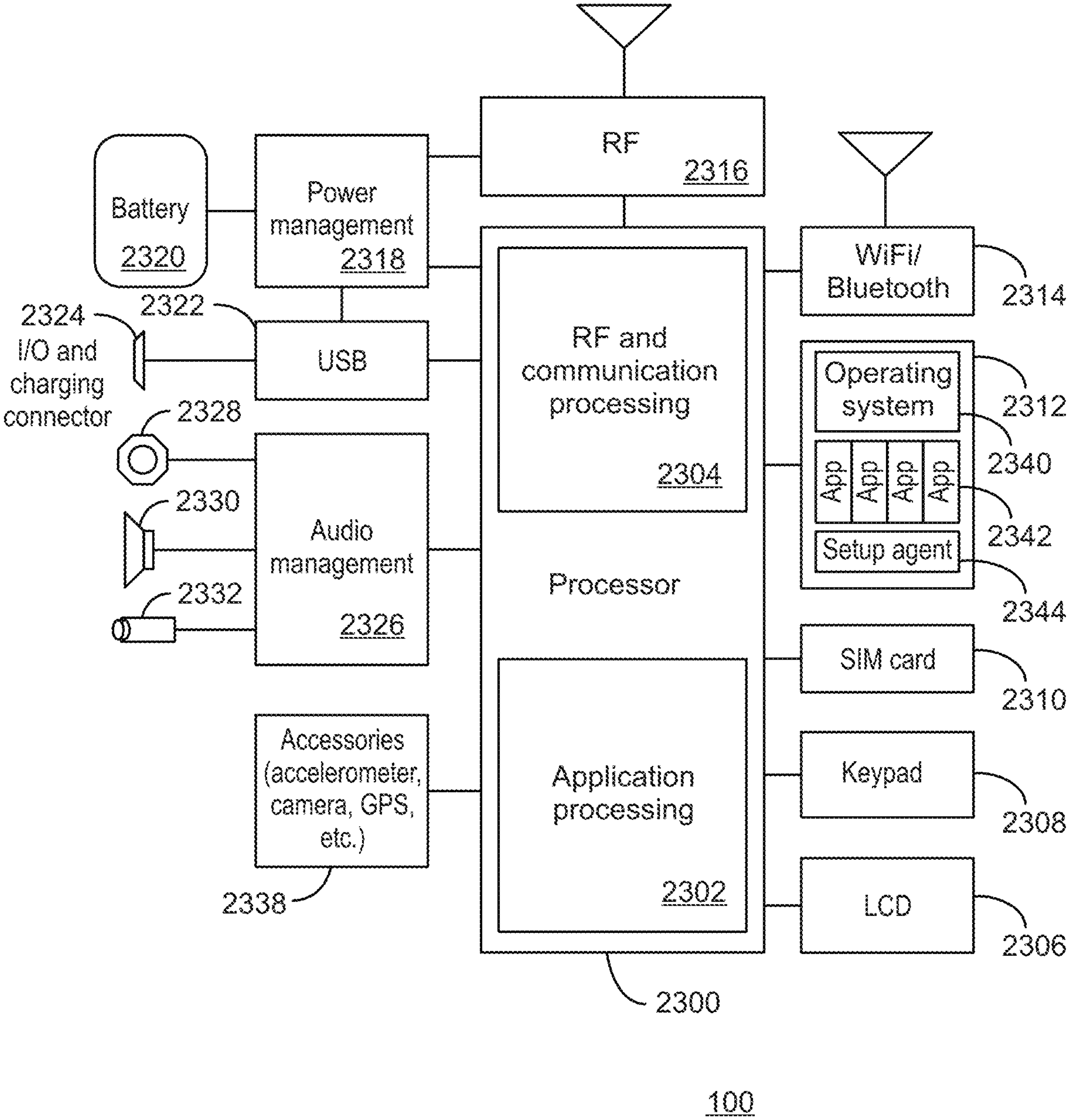
FIG. 6 illustrates a block diagram of a further example controlling device, particularly one suited for supporting a virtual voice assistant.

With reference to FIG. 6, a further example of a controlling device 100 (or appliance supporting the controlling device functionality 100') includes, as needed for a particular application, processing means 2300 which may comprise both an application processing section 2302 and an RF/communication processing section 2304; an LCD display 2306; a keypad 2308 which may comprise physical keys, touch keys overlaying LCD 2306, or a combination thereof; one or more microphones, a subscriber identification module (SIM) card 2310; memory means 2312 which may comprise ROM, RAM, Flash, or any combination thereof; "WIFI" and/or "BLUETOOTH wireless interface(s) 2314; a wireless telephony interface 2316; power management circuitry 2318 with associated battery 2320; a "USB" interface 2322 and connector 2324; an audio management system 2326 with associated microphone 2328, speaker 2330 and headphone jack 2332; and various optional accessory features 2338 such as a digital camera, GPS, accelerometer, etc. As will be appreciated, the associated microphone can be an integral component of the device or may be remote located and wired or wirelessly coupled to the device. Programming may be provided and stored in memory means 2312 to control the operation of the controlling device 2100 by way of operating system 2340 software such as for example iOS, Android, Linux, Web apps, etc., which operating software may support voice-enabled control as sell as the download and execution of various add-on apps 2342 as necessary for a particular purpose. A setup agent software 2344 may also be provisioned to controlling device 100 in order to facilitate detection, installation, and operation of manufacturer-supplied appliance interface apps. It is also to be understood that, while the illustrated smart device 100 is particularly adapted to receive input via use of a keypad and/or touchpad display that is provided as an integral part of the controlling device 100, the controlling device 100, can be provided input via use of further remote devices such as a remotely located mouse, pointer device, touch pad, or the like. These remotely located input devices would accordingly be adapted to communicate to an associated smart device data that is indicative of user interactions with such input devices to thereby achieve the same purposes described herein, e.g., to navigate and interact with a user interface.

Figure 7:
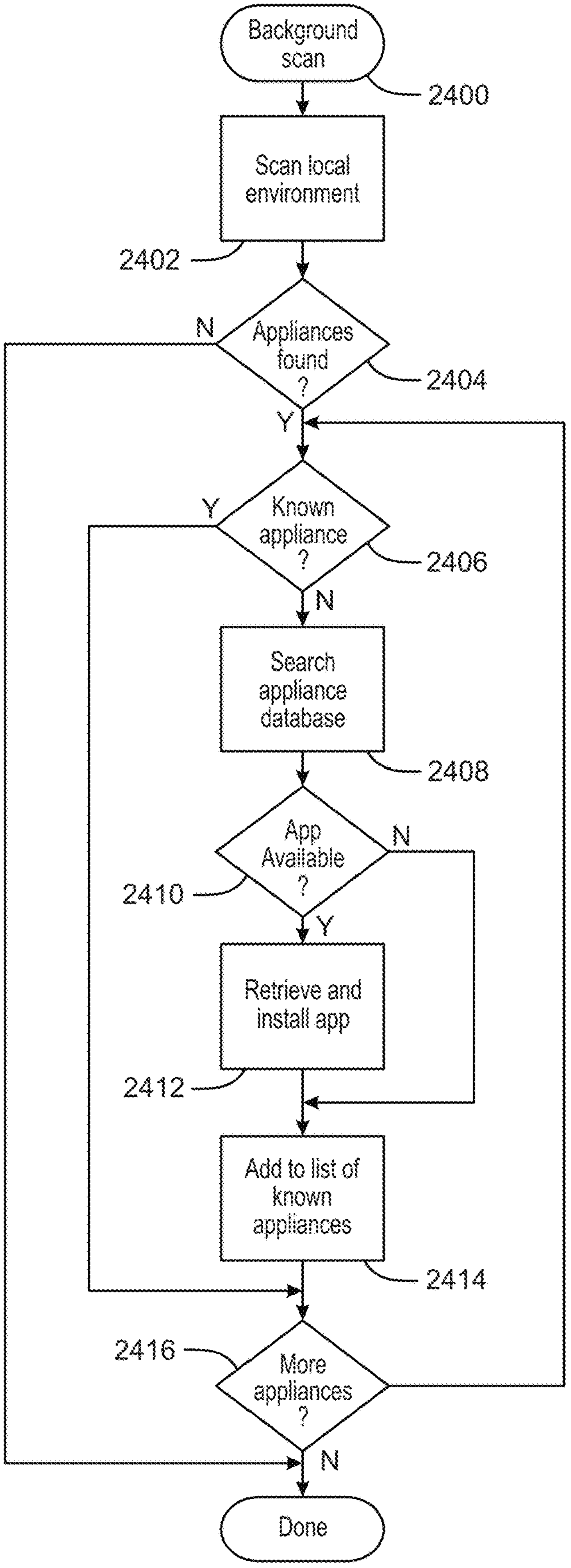
FIG. 7 illustrates an example method for installing an appliance related app.

With reference now to the flowchart of FIG. 7, at step 2400 the setup agent 2344 included with or otherwise associated with the controlling device functionality of the controlling device 100 may periodically initiate a scan 2402 of its current wired and/or wireless network environment (e.g., "WIFI," "BLUETOOTH,", etc. or any combination thereof) in order to ascertain the presence of one or more networked appliances. This action may be initiated automatically (for example based on a timer which is used to measure predetermined periods of time, in response to the device being turned on, in response to a detected change in location of the device using for example its GPS or the like type of functionality, etc.), or when connecting to new networks, or may be manually initiated by a user of device 100 (for example in response to an activation of a user input element, in response to the device 100 being moved, etc.) as appropriate for a particular embodiment. If it is determined at step 2404 that no responsive appliances are present in the environment, the setup agent actions are complete. If, however, responsive devices are detected on the wireless network, e.g., a device responds with data indicative of its identity in response to a polling request message sent from the device 100, then at step 2406 the setup agent may next determine, using the information received, if the responsive appliance is already known to the setup agent, e.g., determine if the appliance has already been detected during a previous detection operation or otherwise manually indicated to the device 100. Such a determination may be made, for example, by consulting a setup agent-administered listing of appliance identities. If the appliance is already known to the setup agent, processing continues at step 2416 to determine if further responsive appliances have been detected.

If it is determined that a newly-responsive appliance has been detected, then at steps 2408 and 2410 the setup agent may next determine if an app is available for that appliance. Such a determination may be made, for example, by using vendor information, a third party compatibility database, or by a social network database which may contain related appliance information updated by other users or by searching a database that functions to cross-reference appliance identifying data as would be received from the appliances (e.g., data indicative of a manufacturer and model number) to available apps and locations from which such apps may be download. Such a database may be stored in local memory 2312 as part of the setup agent programming, may be located at a cloud based data storage facility or server 2116, or a combination thereof, as appropriate for a particular embodiment. It will also be understood that such appliance identifying information may also be cross-referenced within the database to capability information for that appliance. Capability information may include information that would normally be included in an owner's manual and/or engineering specification for the appliance and such information may include, without limitation, schematic diagrams, hardware and software component identifications, supported protocol information, etc.

If no app is available, processing continues at step 2414, adding the instant appliance identity to the listing of known appliance identities. If it determined that an app is available, at step 2412 the appropriate app may be recommended to the user or may be downloaded to the device 100 from a location indicated in the database entry, e.g., a location pointed to by use of a URL, IP address, etc. As will be appreciated, depending on the particular implementation such a download and install may be performed automatically by the setup agent, or the agent may first present the download possibility to the user of device 100 for confirmation. As will also be appreciated, in those instances where the app download is sourced from a site which requires user sign-in and/or authentication, such as for example the "iTunes" brand store or "Android Marketplace" brand store, user credentials may be pre-loaded into the setup agent program to facilitate such automatic download or may be requested from smart device user each time download is to be performed.

When an app is downloaded and installed, in some embodiments the setup agent may register that app with a cloud based service, by way of forwarding unique identity information regarding the app and the environment (e.g., network and/or app owner information) in which it is operational to a server system such as for example the server 206. Such registration information may be subsequently utilized for the purpose of synchronizing multiple instances of the same app across different Operating Systems.

Next, at step 2414, the setup agent may add the current appliance identity or appliance fingerprint into a local tabulation of known appliances. Such an identity may comprise a serial number, MAC address, or any other data value suitable to uniquely identify the appliance. Thereafter, at step 2416 the setup agent may ascertain if additional responsive appliances were detected and, if so the process described above is repeated, until all responding appliances have been accounted for.

In some embodiments, provision may also be made within the setup agent programming to allow a user to purge or edit entries in the tabulation of known appliances, for example when a smart device is permanently relocated to a different environment, etc. Removal of known appliance tabulation entries may also be performed automatically by the setup agent when a previously responsive appliance has failed to acknowledge several scan cycles; when an associated app is deleted by the user of the smart device; etc.

In some embodiments, the setup agent may simply provide an already installed remote control app (or native programming of a remote control device) with the command code sets (or links to command code sets) and/or user interface(s) needed to control one or more of the appliances within the ecosystem. Accordingly, the concept described are not intended to cover only just the search, installation and use of "Apps" that provide for control and data exchange with the devices. Rather, those of skill in the art will understand how to apply the teachings set forth herein to a non-App dependent or partial App dependent controlling device/controlling method.

Furthermore, in conjunction with the installation of certain apps which require specific equipment configurations, the setup may also generate macro command sequences as necessary to place various appliances into the required state upon initiation of the app and/or upon activation of a predetermined input element associated with the app. By way of illustration without limitation, a TV viewing or game show participation app may require that a TV to be set to a particular input and/or a cable set top box be tuned to a particular channel, etc., in which case a command sequence ("macro") may be created by the setup agent to be executed every time that app is initiated. As will be understood by those skilled in the art, a single GUI may display all of the app links and common macros across the system. Since methods for control of entertainment appliances and/or use of macros are well known in the art, these will not be discussed further herein, however for additional information the interested reader may turn to for example U.S. patent application Ser. No. 13/657,176 "System and Method for Optimized Appliance Control" or Ser. No. 13/071,661 "System and Method for Facilitating Appliance Control via a Smart Device", both of common ownership and both incorporated herein by reference in their entirety.

In some circumstances, once the system is configured, the system may monitor for appliance responses (or lack of appliance responses) to the transmission of commands (alone or included in a programmed macro command sequence) for the purpose of attempting to automatically (or via user instruction) rectify any programming, interconnectivity, interoperability, and/or device configuration problems that may exist within the system. For example, as described in US 2018/0098110, using keypress notification data/command transmission notification data, the operating software of an appliance, such as an AV receiver, may be adapted to monitor the AV inputs and outputs for the expected result of a user or system initiated command. If the expected result does not occur, a virtual voice assistant associated with the appliance/system may inform the user of the error, may prompt the user to retry the command, to check the operating mode of controlling device 100, etc. In this manner, if the currently selected activity is "Watch a Movie" and the operating software of AV receiver is notified by controlling device 100 that the "Play" key has been actuated, the operating software of the AV receiver may inspect the DVD player input to discern if a corresponding change in AV input data has occurred, for example an audio component has become present in a digital data stream where there was none before, and, if an error is detected, the operating software of the AV receiver may interact with the user to notify the user of the problem and to attempt to guide the user in the performance of corrective measures, generally considering the capability information for the devices. In circumstances where the appliance software is capable of automatically rectifying the discerned problem, for example having the ability to cause a command to be transmitted to change a state of the remote control, an appliance within the system, a network connection, etc., such action can be performed. Similarly, the operating software may monitor the reported user activity on controlling device 100 for patterns indicative of a problem, such as repeated actuation of the "Play" key 204 within a short space of time which would indicate to the system that an expected appliance response has not occurred. Yet further, the virtual voice assistant may listen for key words that are indicative of a problem, such as keywords found in a user "why won't the movie play?" and may use such key words, and the capability information retrieved for the system, to try and solve the problem, such as by guiding a user to change the input of the TV to the DVD player, etc.

As noted, a voice platform enabled device 100 can be used to discover an appliance and, after the appliance is discovered, a finger print for the appliance, e.g., manufacturer information, brand information, device type information, device model information, firmware version information, supported control interface information, information about a supported app running on the device, information about a supported app running on the device 100 for use with the device, and/or the like information usable to uniquely identify an appliance, may be used to retrieve one or more apps (which apps may include or provide access to appropriate command data, formatting information, etc. as needed) for providing voice control capabilities to the system. Furthermore, it is contemplated that, in some instances, an appliance discovery process can be utilized as described above for the purpose of determining if an appliance supports control via a voice enabled platform, e.g., to determine if the appliance is an "ALEXA" cloud-based, voice serving platform compatible device and, in the event the device 100 does not have the appropriate software for supporting that device already installed thereon, e.g., the "ALEXA" cloud-based, voice service platform software, the "SIRI" cloud-based, voice service platform supporting software, the "GOOGLE ASSISTANT" cloud-based, voice service platform software, the device 100 may be caused to first install such software in memory whereupon execution of that software may be used to perform further device discovery for use in obtaining one or more apps (also known as a "skill," "Action," or the like) for use in connection with the voice service platform supporting software to thereby configure the device 100 to communicate with that appliance. As before, any such located operating software and/or apps may be atomically installed on a device as a part of this process or may require manual installation (in which case, the user may be notified of the software and/or apps located and prompted for installation). Likewise, any discovery process may be performed automatically or upon manual instruction as described above.

In a similar manner, a voice platform enabled device 100 can be used to discover a service and, after the service is discovered, a fingerprint for the service, e.g., manufacturer information, brand information, information about an app running on the appliance, and/or the like information usable to uniquely identify a service, may be used to retrieve one or more apps (which apps may include or provide access to appropriate command data, formatting information, etc. as needed) for providing voice control capabilities to the system. Furthermore, it is contemplated that, in some instances, a service discovery process can be utilized as described above for the purpose of determining if an appliance supports a service that is controllable via a voice enabled platform, e.g., to determine if the appliance supports an "ALEXA" cloud-based voice serving platform compatible service and, in the event the device 100 does not have the appropriate software for supporting that service already installed thereon, e.g., the "ALEXA" cloud-based voice service platform software, the "SIRI" cloud-based voice service platform supporting software, the "GOGGLE ASSISTANT" cloud-based voice service platform software, the device 100 may be caused to first install such software in memory whereupon execution of that software may be used to perform further service discovery for use in obtaining one or more apps (also known as a "skill," "action," or the like as noted above) for use in connection with the voice service platform supporting software to thereby configure the device 100 to communicate with that service and/or other appliances within the system. As before, any such located operating software and/or apps may be atomically installed on a device as a part of this process or may require manual installation (in which case, the user may be notified of the software and/or apps located and prompted for installation). Likewise, any discovery process may be performed automatically or upon manual instruction as described above.

It is further contemplated that the system may listen for and/or solicit the user to speak keywords for this same purpose. In this regard, the keywords might not only include the above noted information usable to form a fingerprint for an appliance and/or a service but might also include keywords that are known to be recognizable by a specific cloud-based, voice service platform. For example, upon the user speaking a wake work specific to a given type of digital assistant, e.g., "Alexa," "Hey Google," Hey Siri," Hey Xfinity" or the like, the system may cause the operating software associated with that digital assistant to be provided to the device 100 for installation (or may cause such operating software to be enabled if already resident of the device 100) and, if needed or desired, the operating software for the voice enabled platform, once operating on the device 100, can be used to perform further appliance and/or service detection processes for use in connection with configuring the device 100 with apps usable to communicate with such appliance and/or services as described above.

For use in identifying the appropriate operating software and/or apps that are to be provisioned to the device 100 as a part of these above-described processes, the database additionally cross-references fingerprint information to such operating software and/or apps. As noted previously, the database may be stored in memory of a local device and/or stored in memory associated with a server device that is accessible via a wide-area-network, e.g., stored in database associated with a cloud-computer service. In this manner, information needed to locate and download the appropriate operating software and/or apps can be deduced by a device and used to retrieve such software and/or apps from its own memory and/or memory associated with still further services, e.g., from a database associated with a third party server. It is also contemplated that any such software and/or app providing service can track owner information, e.g., log-in information, privileges, appliance(s) registered to the user, etc., to limit the ability to access and download apps, to seamlessly integrate downloaded and installed apps into the system, etc. For example, a cloud service provided for the noted purposes may function to authenticate a user when they log into the service and thereafter, using device and/or service discovery information received from one or more devices on the user's system, establish an ownership mapping between the user, the smart device, and appliances/services that will be included in the user's "connected" environment. Again, such gathered information can be used in connection with attempting to trouble shoot any errors with the system that are raised by a user or otherwise automatically discerned.

As will be further understood by those of skill in the art, when using an app lookup API it is feasible for the voice assistant operating on the voice enabled platform of device 100 to notify and recommend to a user a skill, accessory, etc. for use with an appliance or service that was recently added to a network, e.g., a local area network, and/or to notify and recommend to a user a newly available skill, accessory, etc. for use with an appliance or service that was previously added to a network. The availability of such skills or the like can be indicated to the user on the device 100, such as by having the device 100 display a special illumination pattern via use of LEDs, via an audible a notification, or the like. A user can then ask the voice assistant to check what the notification is about, which will lead to a recommendation whereupon the user can voice an acknowledgement to permit installation of the skill, to purchase the accessory, etc. The purchase or an item (and installation of a skill if so purchased) can be performed via use of a cloud API call using input parameters such as the user identification, device 100 ID, skill ID, and the like as needed for any particular purpose. Alternatively, a user may also set a policy that any matched skills are allowed to be installed automatically in which case the smart device 100 will skip the skill recommendation and invoke the skill installation API when a new, matching skill is discovered without further user intervention.

Once the system is configured according to the above, it will be appreciated that the system can be used to provide a vacation mode of home device operation. In the vacation mode of operation, the system is intended to create a lived-in simulation that mimics the behaviors of those residing in the unit to thereby make the unit appear to be lived-in when it is vacant. The vacation mode is thus provided to, among other things, to discourage home break-ins by making the unit appear to be currently occupied.

More particularly, it is contemplated that the system will be used to control the state of home entertainment systems, lighting devices, and other smart home features to create the lived-in simulation. The system will therefore generally include one or more controlling devices 100 and one or more controllable devices, such as home entertainment and Smart Home products, that the one or more controlling devices 100 are configured to interact with/control. In addition, the system may include controllable devices that do not have the capability to interact with the controlling devices 100, e.g., independent devices with minimal functions/interfaces that are typically designed to work with a given controller/gateway device. Still further, it is contemplated that one or more of the devices, preferably a controlling device 100, will be coupled to the internet and, accordingly, have access to a cloud server 206. With such a configuration, the system may support use-cases that involve remote monitoring and access to devices within the home for the end user as well as technical support. Furthermore, the information that is captured to provide the lived-in simulation may be used to provide technical support and/or marketing support, for example, to trouble shoot any possible issues that might arise within the system, to locate appliance and/or network interoperability problems, to discern and inform a user of capabilities that are not being used (or which are being underutilized), to inform a user of a device that might need to be replaced or updated, and the like.

Figure 8:
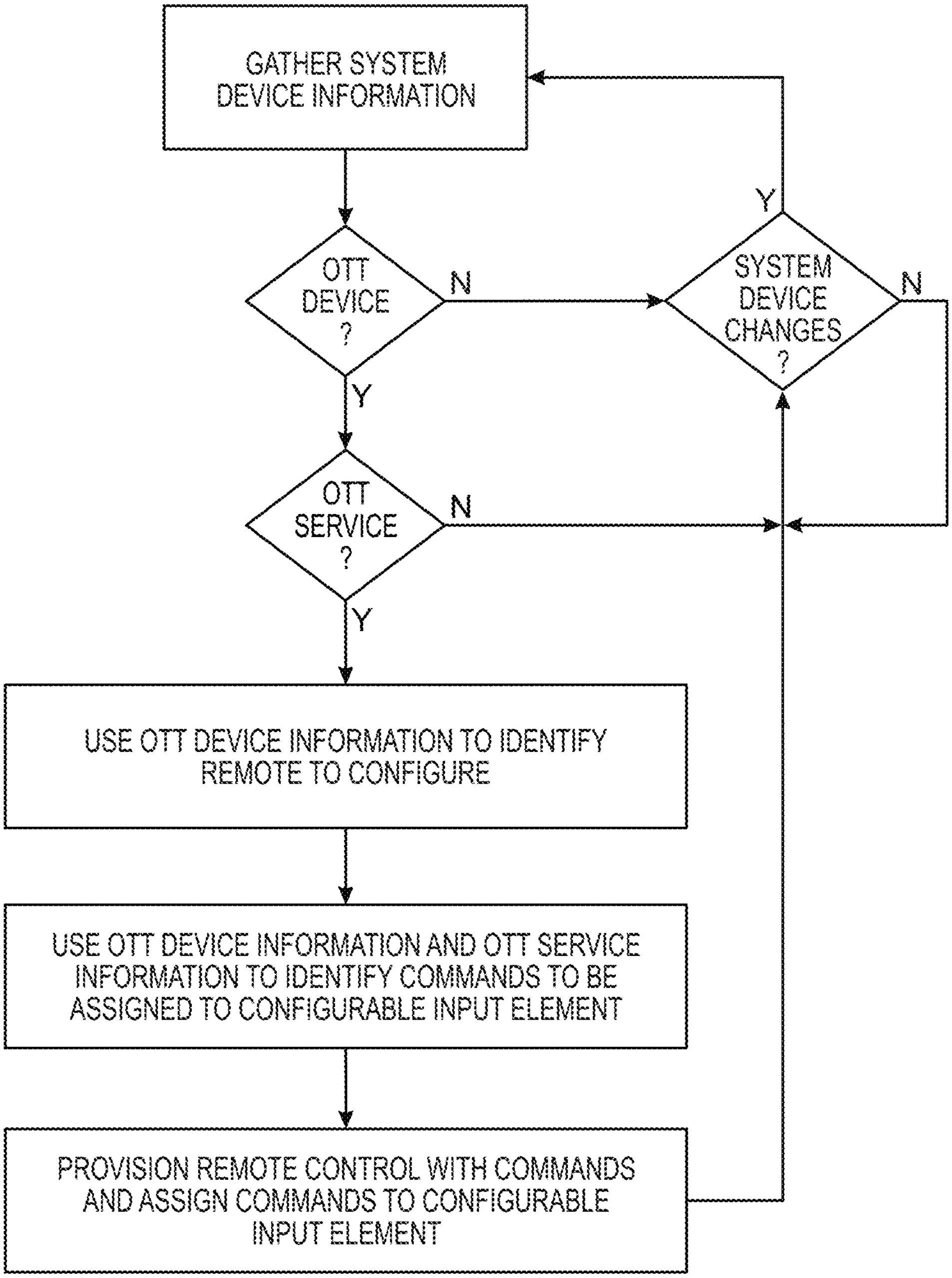
FIG. 8 illustrates an example method for providing a vacation mode of home device operation.

For use in creating a vacation mode operational profile, information regarding the states and interactions of these system devices will be captured and preferably provided to the cloud server 206. As shown in FIG. 8, from the state and interaction information captured by the system, e.g., gleaned from commands and other communications exchanged between devices within the system, the server 206 will extract a pattern of system usage. A pattern may comprise, for each device, the day of the week and the times of the day at which a respective one of devices was caused to change states in response to a command from the user, together with the specific state change and or command. In some cases, the state of a device may be tied to the state of another device. This information may be gathered, for example, through use of a polling mechanism that cheeks the state of each of devices per time interval, e.g., per interval of five minutes, or through an interrupt mechanism under which devices broadcast or otherwise notify server when their state has changed or when a command is issued to cause a state change. Server 206 may then store, per device, information indicative of the state changes and the associated time stamps in a memory, such as data store 207. The data may be cross-referenced to the fingerprint information obtained for the device or other device identifying data as appropriate. Memory 207 thus comprises data from which a collection of daily patterns of usage of devices can be extracted. For example, the collection comprises patterns identically as recorded, or variations thereof, e.g., by time-shifting the events as recorded, or created by, statistical analysis of the recorded information.

A software application, e.g.; installed on device 100, in communication with the server 206 may then takes these patterns as input for control of devices using the proper commands associated by the state changes specified by the patterns used. In this regard, it will be appreciated that the devices may be controlled by the sending of discrete commands or by the sending of commands that are dependent upon a current state of the device (particularly the first-time vacation mode is entered). The system may accordingly utilize the intelligence described above to get to a desired state from a current state, for example, the intelligence that uses the status of connected appliances, e.g., powered or not powered, currently selected input, playing or paused, etc., as may be discerned from interfaces 508 through 514, to facilitate adjustment of appliance settings to match user-defined activity profiles, e.g. “Watch TV”, “View a movie”, etc.

For the independent devices the system may include a sniffer application that monitors wireless and/or wired communications and determines a usage profile for the relevant devices and services based on address information that would be contained in such communications. This state information may be cross-referenced to state information for the controlled device 100 to thereby allow the system to replicate the state for these devices based upon the state for the controlled device 100 during the vacation mode play back. Thus, the pattern information (and appropriate command(s) may then be provided to a device 100 from the server 206 that has the capabilities of transmitting such commands using the protocol that is recognizable by the intended target device. for the to extract the patterns.

It will be appreciated that all or part of the monitoring, information storage, pattern creation, and control according to a created pattern can be implemented on one or more local controlling devices 100 without the need to use the cloud server 206. Thus, when no primary/secondary/backup internet connection is available, the usage learning and playback can still take place on device 100 and the learning/playback can be managed by the device itself (via its user interface)

or via a mobile device that is connected to the same local network. When a device 100 does, however, have an alternate/secondary/backup communication channel with a server 206, the operations of discovery, identification, control, usage learning and playback can continue by leveraging these connections to maintain the connection with the cloud server 206. In this case, third party service providers (via cloud service and/or mobile apps) can interface with the cloud to manage, enhance, the learning/playback of usage behavior. Additionally, such services they can enhance services like security monitoring by being able to access devices in the home to ensure they are playing back the activities they should.

It will be still further appreciated that, when a system is operating in vacation mode, the system, e.g., a device 100 and/or server 206 in communication with one or more devices in the system, can continue to monitor one or more of the devices as described above and, if a device is operated in a manner that is not specified by the pattern being utilized, a notification may be sent to a home owner, monitoring service, etc. to inform the recipient that it is likely that an unauthorized individual is in the home as desired.

In some circumstances, an app installed on a mobile device, as described above, can be used to initiate the device discovery process, can be used to facilitate the setup setup/configuration of the control relationships between a device 100 and other devices 100 within the system as well as controllable devices. Such an app can thereafter by used to initiate the process (and end the process) of learning system usage patterns, can be used to review any learned patterns, and can be used to edit/modify any such learned patterns. To this end, command macro creating and editing functionality can be incorporated into the app. In this regard, the app may provide to a user via an appropriate user interface a calendar of learned operations and system states and the commands/communications that are to be transmitted at various times to place the system into given states during the playback operation. The user may then interact with this calendar as desired to review and/or modify the playback operation. The app may also provide a means for the user to activate the vacation mode of operation, to pause an activated mode of operation, to change an activated mode of operation, and/or to monitor the activated mode of operation.

While various concepts have been described in detail, it will be appreciated by those skilled in the art that various modifications and alternatives to those concepts could be developed in light of the overall teachings of the disclosure. Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents and patent applications cited within this document are hereby incorporated by reference in their entirety.

What is claimed is:

1. A controlling device adapted for simulating a prior usage of at least a controllable device, comprising:

a processing device;

a memory coupled to the processing device;

a first communications interface; and a second communications interface;

wherein the memory stores instructions and the instructions, when executed by the processing device, cause the controlling device to perform steps comprising:

while operating in a normal mode of operation, extracting by the controlling device from first command communications transmitted by the controlling device command and address data;

using by the controlling device the command and address data extracted from the first command communication to generate a vacation mode operational data; and in response to the controlling device being placed into a vacation mode of operation, using by the controlling device the vacation mode operational data to cause the controlling device to issue second command communications to at least the controllable device via the first communications interface for the purpose of simulating the prior usage of at least the controllable device;

wherein the controlling device comprises a universal remote control device, the controllable device comprises a television, and the universal remote control device comprises an input element for placing the universal remote control device into the vacation mode of operation.

2. The controlling device as recited in claim 1, wherein the instructions, when executed by the processing device, cause the controlling device to respond to a pause command received from a server device via the second communications interface by pausing the using of the vacation mode operational data.

3. The controlling device as recited in claim 1, wherein the instructions, when executed by the processing device, cause the controlling device to use data that functions to identify the controllable device to configure itself to communicate with the controllable device via the first interface.

4. The controlling device as recited in claim 1, wherein the first interface comprises a wired communications interface.

5. The controlling device as recited in claim 1, wherein the first interface comprises a wireless communications interface.

6. The controlling device as recited in claim 1, wherein the step of extracting command and address data comprises associating a time stamp with the command and address data extracted from the first command communication wherein the time stamp data is further utilized by the controlling device when generating the vacation mode operational data.

7. The controlling device as recited in clam 1, further comprising associating a captured state of the controlled device with the command and address data extracted from the first command communication where the captured state of the controlled device is also used by the controlling device when generating the vacation mode operational data.

8. The controlling device as recited in claim 1, wherein the instructions, when executed by the processing device, cause the controlling device to periodically capture data indicative of a state of the controlling device whilst operating in the vacation mode of operation for use in generating an alarm if an indicated state of the controlling device fails to correspond to an expected playback state of the controlling device.

9. A method for simulating a prior usage of at least a controllable device, comprising:

while operating in a normal mode of operation of a controlling device, extracting by the controlling device from first command communications transmitted by the controlling device command and address data;

using by the controlling device the command and address data extracted from the from the first command communication to generate a vacation mode operational data; and in response to the controlling device being placed into a vacation mode of operation, using by the controlling device the vacation mode operational data to cause the controlling device to issue second command communications to at least the controllable device via a first communications interface of the controlling device for the purpose of simulating the prior usage of at least the controllable device;

wherein the controlling device comprises a universal remote control device, the controllable device comprises a television, and the universal remote control device comprises an input element for placing the universal remote control device into the vacation mode of operation.

10. The method as recited in claim 9, further comprising causing the controlling device to respond to a pause command received from a server device via a second communications interface by pausing the using of the vacation mode operational data.

11. The method as recited in claim 9, further comprising causing the controlling device to use data that functions to identify the controllable device to configure itself to communicate with the controllable device via a second interface.

12. The method as recited in claim 9, wherein the first interface comprises a wired communications interface.

13. The method as recited in claim 9, wherein the first interface comprises a wireless communications interface.

14. The method as recited in claim 9, further comprising associating a time stamp with the command and address data extracted from the first command communication wherein the time stamp data is further utilized by the controlling device when generating the vacation mode operational data.

15. The method as recited in claim 9, further comprising associating a captured state of the controlled device with the command and address data extracted from the first command communication where the captured state of the controlled device is also used by the controlling device when generating the vacation mode operational data.

16. The method as recited in claim 9, further comprising causing the controlling device to periodically capture data indicative of a state of the controlling device whilst operating in the vacation mode of operation for use in generating an alarm if an indicated state of the controlling device fails to correspond to an expected playback state of the controlling device.

* * * * *